(12) United States Patent
Takano

(10) Patent No.: US 7,749,339 B2
(45) Date of Patent: Jul. 6, 2010

(54) PROCESS FOR MANUFACTURING AN AIRBAG INFLATOR BOTTLE MEMBER

(75) Inventor: Takashi Takano, Wakayama (JP)

(73) Assignee: Sumitomo Metal Industries, Ltd., Osaka (JP)

( * ) Notice: Subject to any disclaimer, the term of this patent is extended or adjusted under 35 U.S.C. 154(b) by 443 days.

(21) Appl. No.: 11/783,007

(22) Filed: Apr. 5, 2007

(65) Prior Publication Data

US 2007/0246130 A1    Oct. 25, 2007
US 2010/0126634 A9    May 27, 2010

Related U.S. Application Data

(63) Continuation of application No. PCT/JP2007/052090, filed on Feb. 7, 2007, and a continuation of application No. 11/714,124, filed on Mar. 6, 2007.

(60) Provisional application No. 60/900,366, filed on Feb. 9, 2007.

(30) Foreign Application Priority Data

Feb. 9, 2006    (JP)    ............................. 2006-032535

(51) Int. Cl.
*C22C 38/18*    (2006.01)
*C21D 8/10*    (2006.01)

(52) U.S. Cl. .................. 148/333; 148/334; 148/335; 148/593; 148/909; 148/519; 280/736; 280/743.1

(58) Field of Classification Search ................ 148/320, 148/333–336, 580, 593, 954, 590, 909, 519; 280/730.1, 743.2, 743.1, 736, 741
See application file for complete search history.

(56) References Cited

U.S. PATENT DOCUMENTS 6,589,373 B2 *    7/2003    Starozhitsky et al.    ........ 148/570

6,878,219 B2 *    4/2005    Kondo et al. ................. 148/333
7,316,143 B2 *    1/2008    Kondo et al. .................... 72/97

FOREIGN PATENT DOCUMENTS

| DE | 19652335 | * | 3/1998 |
| JP | 08-325641 | | 12/1996 |
| JP | 10-140250 | | 5/1998 |
| JP | 10-140283 | | 5/1998 |
| JP | 2002-256385 | * | 9/2002 |
| JP | 2002-294339 | | 10/2002 |
| JP | 2003-201541 | | 7/2003 |
| JP | 2005-060796 | | 3/2005 |

OTHER PUBLICATIONS

Machine- English translation of Japanese patent 10-140283, Beppu Kenichi et al., May 26, 1998.*

* cited by examiner

*Primary Examiner*—Deborah Yee
(74) *Attorney, Agent, or Firm*—Clark & Brody

(57) ABSTRACT

An airbag inflator bottle member comprising a tubular body having a reduced-diameter portion at an end portion for fitting an initiator or the like thereto in which the reduced-diameter portion has a good low temperature toughness comparable to that of the portion which is not reduced in diameter is manufactured by the following method. A steel tube having a composition comprising C: 0.05-0.20%, Si: 0.1-1.0%, Mn: 0.10-2.0%, Cr: 0.05-2.0%, sol. Al: at most 0.10%, Ca: 0.0003-0.01%, optionally one or more elements selected from Cu: at most 1.0%, Ni: at most 1.5%, Mo: at most 1.0%, V: at most 0.2%, Nb: at most 0.1%, and Ti: at most 0.1%, and a remainder of Fe and impurities in which P: at most 0.025% and S: at most 0.010% is subjected to cold working, then it is cut to a predetermined length, and the cut steel tube is subjected to reducing in at least one end portion thereof and then to quenching and tempering.

4 Claims, 1 Drawing Sheet

PROCESS FOR MANUFACTURING AN AIRBAG INFLATOR BOTTLE MEMBER

This is a continuation application based on PCT/JP07/52090 filed on Feb. 7, 2007 and also claims priority under 35 U.S.C. §§120/119(e) as a continuation of application Ser. No. 11/714,124, filed on Mar. 6, 2007, which claims priority under 35 U.S.C. §§119(e) based on provisional application No. 60/900,366 filed on Feb. 9, 2007.

TECHNICAL FIELD

This invention relates to a process for manufacturing a bottle member for an airbag inflator (an airbag inflator bottle member). Specifically, the present invention relates to a process for manufacturing an airbag inflator bottle member having a reduced-diameter portion provided on the end of a tube for mounting an initiator or a lid plate, the portion having good low temperature toughness comparable to that of a portion which is not reduced in diameter.

BACKGROUND ART

Airbags for the driver's seat and the passenger seat for increasing the safety of automobiles are already becoming standard equipment. In recent years, the types and number of airbags mounted on automobiles have been increasing more and more, and side airbags and curtain airbags for side impacts, knee bags for protecting the lower extremities, and the like are being developed.

Methods of operating an airbag include chemical types in which an explosive chemical is used to generate a gas for expanding an airbag and hybrid types (including pressure storage types) in which a member referred to as an inflator (or an accumulator) is filled with a high-pressure gas for expanding an airbag. Chemical types were the first to be developed, and hybrid types were later developed due to a demand for an increase in the responsiveness of the expanding speed of airbags and adjustment of the gas pressure. In addition, a pressure storage type has been developed for curtain airbags which require a relatively long holding time. At present, the type which is used depends upon the performance demanded of the airbag, the location of installation, and the like.

An inflator for use in a typical hybrid type airbag (including a pressure storage type airbag) has a structure comprising a bottle member which is a short steel tube having both ends reduced in diameter by drawing, one end (the end to be connected to an airbag) of the bottle member being closed with a lid plate welded thereto, and an initiator (an airbag triggering unit) being secured on the other end of the bottle member. The interior of the bottle member is filled with a high-pressure inert gas. When a collision is sensed, the lid plate is opened either mechanically or by a rise in internal pressure, and the high-pressure gas inside the inflator is discharged all at once into the airbag so that the airbag is inflated.

Accordingly, a bottle member used for manufacturing a inflator for a hybrid type airbag (including a pressure storage type) is subjected to stress at a high strain rate in an extremely short period of time. Therefore, in contrast to a simple structural member such as a conventional pressure cylinder or line tube, this bottle member is required to have not only a high dimensional accuracy, workability, and weldability, but it is also required to have high strength and excellent burst resistance as well as high toughness. Automobiles may be used in cold regions, so burst resistance must be maintained at a low temperature of −40° C. or below.

Even with an inflator for a chemical type airbag having its interior filled with an explosive chemical, when gas is generated at the time of an impact, its interior reaches a high pressure. Recently, the generated pressure has been increasing with an improvement in the performance of chemicals, and burst resistance comparable to that for hybrid types has come to be demanded of bottle members for chemical type airbag inflators.

In the present invention, an airbag inflator bottle member means a steel member comprising a tubular body which has at least one end portion reduced in diameter and which is used for manufacturing a steel storage portion (namely, an inflator) for housing high-pressure gas and/or a propellant (an explosive chemical) for use in expanding an airbag or other passenger restraint system.

This bottle member has its interior formed into a sealed space by securing a lid plate and an initiator, or the like by welding or a similar method, and it is used as an inflator. The type of airbag can be a hybrid type (including a pressure storage type) or a chemical type. In the case of a hybrid type (including a pressure storage type), the interior of the inflator is filled with a high-pressure gas, and in the case of a chemical type, the interior of the inflator is filled with a propellant prior to sealing.

As stated above, increased strength, a reduced wall thickness, a decrease in size, and higher toughness are demanded of an airbag inflator bottle member.

A typical conventional process for manufacturing an airbag inflator bottle member comprises either (a) subjecting a steel tube (steel tube) as a material to be worked to quenching and tempering and then performing thereon drawing and stress relief annealing, or (b) subjecting a steel tube as a material to be worked to drawing followed by quenching and tempering of the tube. Subsequently, the steel tube is cut to a predetermined length, and one or both ends of the tube undergoes a reduction in diameter in order to allow parts such as an initiator to be fitted to the ends. Furthermore, the tube undergoes various types of working including piercing, local working such as spherical indentations, for example, fitting with a lid plate and an initiator by welding. See, for example, the following Japanese patent publications JP H08-325641 A1; JP H10-140250 A1; JP H10-140283 A1; JP 2002-294339 A1; JP 2003-201541 A1; and JP 2005-60796 A1.

DISCLOSURE OF THE INVENTION

Automobile makers demand a guarantee that an airbag inflator be able to operate in general from a low temperature region of −40° C. to a high temperature region of +80 to +90° C. In addition to this guarantee of operation, in order to secure a higher safety of inflators, there has come to be a demand that a tubular member for manufacturing an airbag inflator in the form of a steel tube which has been cut and subjected to end reducing (referred to in this specification as an airbag inflator bottle member) have a high toughness which is evidenced by not exhibiting brittle fracture in a burst test at −40° C.

There is a tendency for the reduced-diameter portion of an airbag inflator bottle member, which portion is necessary to fit an initiator and like thereon, to generally have a lower toughness compared to a portion thereof which is not reduced in diameter and which has not undergone diameter reducing. In low temperature burst tests up to the present time, although there is a difference depending upon the shape of the reduced-diameter portion, there were cases in which a location with a reduced toughness in a reduced-diameter portion became a starting point of cracks and exhibited brittle fracture.

The object of the present invention is to provide an airbag inflator bottle member which has a reduced-diameter portion having good tow temperature toughness comparable to that of a portion which is not reduced in diameter and which thus has excellent low temperature toughness in which brittle fracture does not occur in a low temperature burst test at −40° C.

In brief, the present invention is based on the original concept that by changing the order of steps in the manufacture of a bottle member so as to perform quenching and tempering after carrying out cold working of a steel tube (a material to be worked) and subsequent diameter reducing of the ends thereof, the low temperature toughness of the reduced-diameter portions of an airbag inflator bottle member can be increased to the same level as a portion which is not reduced in diameter.

The present invention is a process for manufacturing an airbag inflator bottle member comprising a tubular body having a reduced-diameter portion in at least one end portion thereof, comprising performing cold working on a steel tube having a steel composition which consists essentially of C: 0.05-0.20% (in this specification, unless otherwise specified, % with respect to composition means mass percent), Si: 0.1-1.0%, Mn: 0.10-2.0%, Cr: 0.05-2.0%, sol Al: at most 0.10%, Ca: at most 0.01%, optionally one or more elements selected from Cu: at most 1.0%, Ni: at most 1.5%, Mo: at most 1.0%, V: at most 0.2%, Nb: at most 0.1%, and Ti: at most 0.1%, and a remainder of Fe and unavoidable impurities, the contents of the impurities being at most 0.025% for P and at most 0.010% for S, cutting the cold worked steel tube to a predetermined length, reducing the diameter of at least one end portion of the cut steel tube, and then subjecting the steel tube to quenching and tempering such that the tensile strength of the portion of the tube which is not reduced in diameter is at least 700 MPa.

An airbag inflator bottle member according to the present invention can be applied to either a hybrid type (including a pressure storage type) or a chemical type of airbag.

According to the present invention, it is possible to manufacture an airbag inflator bottle member having excellent burst resistance and reliability in which a reduced-diameter portion of the member for fitting an initiator or the like thereon has good low temperature toughness comparable to that of a portion thereof which is not reduced in diameter. A reduced-diameter portion is formed in at least one end portion or in both end portions of a cut steel tube. It is also possible to form a reduced-diameter portion in a location other than the end portions of the tube.

BEST METHOD FOR CARRYING OUT THE INVENTION

Figure 1:
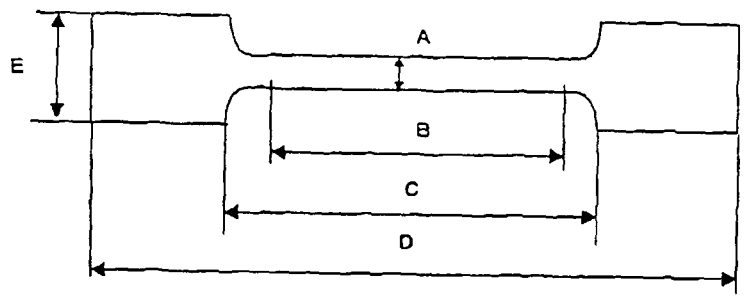
FIG. 1 is an explanatory view showing the cross-sectional shape of a tensile test piece.

An embodiment of a process for manufacturing an airbag inflator bottle member according to the present invention will be specifically described. In this embodiment, an airbag inflator bottle member is manufactured by the steps of (i) manufacturing a steel tube, (ii) first heat treatment, (iii) cold working, (iv) second heat treatment, (v) straightening, (vi) cutting, (vii) reducing in diameter, and (viii) quenching and tempering, Below, each step will be explained in the order in which it is performed.

(i) Manufacture of a Steel Tube

In this embodiment, the composition of a steel tube used as a material to be worked (a blank tube) has a steel composition consisting essentially of C: 0.05-0.20%, Si: 0.1-1.0%, Mn: 0.10-2.0%, Cr: 0.05-2.0%, sol. Al: at most 0.10%, Ca: at most 0.01%, optionally one or more substances selected from Cu: at most 1.0%, Ni: at most 1.5%, Mo: at most 1.0%, V: at most 0.2%, Nb; at most 0.1%, and Ti: at most 0.1% as an optional added element, and a remainder of Fe and unavoidable impurities, the impurities having the contents of at most 0.025% for P and at most 0.010% for S. Below, the reasons for the limits on the composition will be explained.

C: at Least 0.05% and at Most 0.20%

C is an element which is effective for inexpensively increasing the strength of steel. If the C content is less than 0.05%, it becomes difficult to obtain a desired high strength of at least 700 MPa. On the other hand, if the C content exceeds 0.20%, the workability and weldability of the steel decrease. Therefore, the C content is made at least 0.05% and at most 0.20%. A preferred range for the C content is at least 0.08% and at most 0.20%, and a more preferred range is at least 0.12% and at most 0.17%.

Si: at Least 0.1% and at Most 1.0%

Si is an element which has a deoxidizing effect and which increases the hardenability of steel and increases its strength. Taking into consideration these effects of Si, at least 0.1% of Si is contained. However, if the Si content exceeds 1.0%, the toughness of the steel decreases. Therefore, the Si content is made at least 0.1% and at most 1.0%. A preferred range for the Si content is at least 0.2% and at most 0.5%.

Mn: at Least 0.0% and at Most 2.0%

Mn is an element which has a deoxidizing action and which is effective at increasing the hardenability of steel and thus increasing its strength and toughness. In order to obtain these effects, at least 0.10% of Mn is contained. However, if the Mn content exceeds 2.0%, MnS, which precipitates as inclusions, coarsens, and it is spread during hot working thereby decreasing the toughness of steel. Therefore, the Mn content is made at least 0.10% and at most 2.0%. The Mn content is preferably at least 0.20% and at most 1.0%, and more preferably at least 0.30% and at most 0.80%.

Cr: at Least 0.05% and at Most 2.0%

Cr is an element which is effective at increasing the strength and toughness of steel. If the Cr content is less than 0.05%, it is difficult to obtain a high strength. On the other hand, if the Cr content exceeds 2.0%, it leads to a decrease in the toughness of welds. Therefore, the Cr content is made at least 0.05% and at most 2.0%. The Cr content is preferably at least 0.2% and at most 1.0%, and more preferably at least 0.4% and at most 0.8%.

Welds include welds of a tube in the case in which the blank tube is a welded tube such as an electric resistance welded steel tube, as well as welds formed at the time of securing a lid plate and an initiator on a bottle member by welding. Accordingly, even when the blank tube is a seamless steel tube, an airbag inflator includes welds.

Sol. Al: at Most 0.10%

Al is an element which has a deoxidizing action and which is effective at increasing the toughness and workability of steel. However, if it contains Al in an amount such that sol. Al exceeds 0.10%, the occurrence of sand marks becomes marked. The Al content (amount of sol. Al) may be on the level of an impurity, so there is no particular lower limit thereof, but it is preferably at least 0.005%. A preferred range for the Al content is at least 0.005% and at most 0.05%.

Ca: at Most 0.01%

By including a minute amount of Ca, the burst resistance of an airbag inflator bottle member can be further improved. In particular, when at least 0.0003% of Ca is contained, the anisotropy of toughness is improved so that the toughness in the T direction of a steel tube is increased. As a result, burst resistance can be further increased. However, if the Ca content exceeds 0.01%, cluster-type inclusions precipitate in the steel, thereby producing the problem of sand marks. Therefore, the Ca content is made at most 0.01%. A preferred Ca content is at least 0.0003% and at most 0.01%, and more preferably at least 0.0005% and at most 0.003%.

In this embodiment, with the object of further improving the strength, burst resistance, and/or weldability of steel, in addition to the above-described components, it is possible for the steel to contain one or more elements selected from Cu, Ni, Mo, V, Nb, and Ti as an optional element.

Cu: at Most 1.0%

Cu exhibits the effect of increasing the toughness of steel. This effect of Cu is obtained even when the content is on the level of an impurity, but in order to obtain a more marked effect, the Cu content is preferably made at least 0.05%. However, Cu decreases the hot workability of steel, so when Cu is contained, preferably Ni is also contained to maintain hot workability. If the Cu content exceeds 1.0%, there are cases in which good hot workability cannot be maintained even if it is added together with Ni. Accordingly, when Cu is contained, its content is made at most 1.0%.

Ni: at Most 1.5%

Ni has the effect of increasing the hardenability and toughness of steel. This effect of Ni is obtained even when its content is on the level of an impurity, but in order to obtain a more marked effect, the Ni content is preferably at least 0.05%. However, Ni is an expensive element, and particularly the content of Ni exceeding 1.5% adds to the costs markedly. Therefore, when Ni is contained, its content is made at most 1.5%. The Ni content is preferably at least 0.05% and at most 1.5%, and more preferably at least 0.1% and at most 1.0%.

Mo: at Most 1.0%

Mo not only has the effect of increasing the hardenability of steel but it also has the effect of increasing strength by solid solution strengthening and precipitation strengthening. Mo can provide these effects even when its content is on the level of an impurity, but in order to obtain these effects more markedly, the content of Mo is preferably made at least 0.05%. However, if the Mo content exceeds 1.0%, welds harden and their toughness decreases. Therefore, when Mo is contained, its content is made at most 1.0%. The Mo content is preferably at least 0.05% and at most 0.60% and more preferably at least 0.10% and at most 0.50%.

V: at Most 0.2%

V increases the hardenability of steel. This effect of V can be obtained even when its content is on the level of an impurity. V also has the effect of increasing strength by precipitation strengthening. In order to obtain these effects of V with certainty, the content of V is preferably made at least 0.01%, but if its content exceeds 0.2%, the toughness of steel decreases. Therefore, when V is contained, its content is made at most 0.2%. The V content is preferably at least 0.01% and at most 0.2% and more preferably at least 0.03% and at most 0.1%.

Nb: at Most 0.1%

Nb increases the toughness of steel. This effect of Nb is obtained even when its content is on the level of an impurity, but in order to obtain this effect more markedly, the Nb content is preferably made at least 0.003% and more preferably at least 0.005%. However, if the Nb content exceeds 0.1%, the toughness of steel ends up decreasing. Accordingly, when Nb is included, its content is made at most 0.1%. A more preferred range for the Nb content is at least 0.003% and at most 0.03%, and a still more preferred range is at least 0.005% and at most 0.02%

Ti: at Most 0.1%

Ti is an element which has a deoxidizing action In addition, it has a strong affinity for N, and at high temperatures, its stably exists as a Ti nitride. Accordingly, it suppresses crystal growth at the time of hot rolling and contributes to an increase in toughness. In order to obtain these effects of Ti more markedly, the Ti content is preferably made at least 0.002% and more preferably at least 0.005%. However, if the Ti content exceeds 0.1%, the toughness of the steel ends up decreasing. Therefore, when Ti is contained, its content is made at most 0.1%.

Elements other than those described above in the steel composition of a steel tube of this embodiment are Fe and unavoidable impurities. The impurities include non-metals such as P, S, O, and N, and metallic impurities which are incorporated in minute amounts from the raw materials and during the tube manufacturing process. In this embodiment, of the impurities, the contents of P and S and preferably O are limited as follows.

P: at Most 0.025%

P brings about a decrease in the toughness of steel caused by grain boundary segregation. In particular, if the P content exceeds 0.025%, the toughness of steel markedly decreases. Therefore, the content of P as an impurity is made at most 0.025%. The P content is preferably at most 0.020% and more preferably at most 0.015%.

S: at Most 0.010%

S decreases toughness particularly in the T direction (the circumferential direction) of a steel tube. In particular, if the S content exceeds 0.010%, toughness in the T direction of a steel tube markedly decreases. Therefore, the content of S as an impurity is made at most 0.010%. The S content is preferably at most 0.005% and still more preferably at most 0.003%.

O (Oxygen):

In the present invention, there is no particular limitation on O. However, an airbag inflator bottle member is subjected to a burst test at a low temperature of −40° C., for example. At this time, if the content of O as an impurity exceeds 0.0030%, the amount of inclusions increase and these inclusions may serve as the starting point of a bursting crack, so depending upon the steel composition, there are cases in which the prescribed burst pressure can no longer be satisfied. In addition, even when the prescribed burst pressure is satisfied, depending on the steel composition, there is the possibility of it becoming the cause of a variation in the burst pressure. Therefore, the content of O as an impurity is preferably made at most 0.0030%. The O content is more preferably at most 0.0020%. However, as shown in the examples, if the O content is at most 0.0050%, sufficient burst resistance may be obtained in many cases.

A steel tube which is subjected to cold working and heat treatment according to the present invention may be either a seamless steel tube manufactured using a mandrel mill or an assel mill, or it may be a welded steel tube such as an electric resistance welded steel tube or an arc welded steel tube. A seamless steel tube is preferred in order to increase the reliability of an inflator. There are no particular limitations on the process for manufacturing a seamless steel tube or a welded steel tube.

There are no particular limitations on the dimensions of a steel tube which is a material to be worked, and they are selected so as obtain a bottle member with predetermined dimensions after cold working.

(ii) First Heat Treatment

In this embodiment, if necessary, prior to cold working, first heat treatment is carried out on a steel tube which is a material to be worked. This first heat treatment is performed so that cold working can be carried out with certainty, and it can be omitted if cold working is possible without heat treatment. An example of the first heat treatment is low temperature annealing in a temperature range of at least 600° C. and at most 700° C.

(iii) Cold Working

Cold working such as cold drawing or cold rolling are carried out on the entire steel tube. The purpose of this cold working is to reduce variations in the dimensions of the steel tube prior to working to form an inflator (reducing the diameter of the tube end portions). As a result, this leads to a decrease in the variation of the burst pressure after working to form an inflator. Specifically, cold working is preferably carried out so as to suppress the variations in the dimensions of the steel tube to at most 1% or at most 0.2 mm in outer diameter and at most 10% or at most 0.4 mm in thickness. The material being worked is a tube, so cold working can be easily carried out by drawing.

If the variation in dimensions of a steel tube is large prior to reducing the diameter of the tube end portions, it results in the problems that wrinkles develop in the reduced-diameter portions after diameter reducing and that the changes in dimensions resulting from quenching and tempering make it impossible to fit an initiator by welding.

(iv) Second Heat Treatment

In order to remove cold working strains caused by cold working of a steel tube which has been cold worked in the above-described manner, if necessary, second heat treatment is carried out. Removal of cold working strains by carrying out this second heat treatment is desirable for eliminating any troubles during subsequent reducing in diameter of the tube end portions. An example of the second heat treatment having the object of stress relief (SR) is low temperature annealing at a temperature of, for example, at least 500° C. and at most 700° C.

(v) Straightening

Next, straightening is carried out on the steel tube to bring the dimensions and shape of the steel tube to target values. The straightening can be carried out, if necessary, by a well-known conventional method such as processing by a roller.

(vi) Cutting

A steel tube which is manufactured in this manner is cut to a predetermined length (200 mm in this embodiment). This cutting can also be carried out using a well-known conventional method. For example, it can be carried out with a band saw or a metal saw.

(vii) Reducing in Diameter

Both ends of the cut steel tube is subjected to reducing (inflator processing) into the shape of an airbag inflator bottle member. The connecting portions of members such as an initiator and a lid plate which are connected to an inflator are reduced in diameter so as to decrease stresses at the time of bursting, so the end portions of the inflator tube which are connected thereto need to be reduced in diameter so as to fit the shape of the connecting portions of the members (initiator, lid plate, and the like) to which the tube is connected. This reduction in diameter can also be carried out by a well-known conventional method. For example, spinning, press working, or the like can be used.

In the past, quenching and tempering were carried out on a steel tube before its end portions are subjected to reducing such that the entire steel tube has a predetermined tensile strength prior to this inflator processing. However, it has been found that in this case, the toughness of reduced-diameter portions after reducing markedly decreases compared to the portion which is not subjected to reducing, and the burst resistance and accordingly the reliability of the inflator are markedly decreased.

In the present invention, by reducing the tube end portions of a cut steel tube prior to quenching and tempering, a bottle member having a high toughness in reduced-diameter portions which is comparable to that in the portion which is not reduced in diameter can be obtained.

In a conventional method in which reducing is carried out after quenching and tempering, it was observed that toughness decreases as the degree of reduction in diameter increases. In contrast, in the present invention, even if reducing is carried out with a higher reduction ratio than in the conventional method, a decrease in toughness is not observed. As a result, steel tubes having different diameters prior to reducing can be subjected to reducing so as to form reduced-diameter portions having the same bore diameter by varying the reduction ratio, and it becomes possible to use the same initiator, lid plate, and the like with various bottle members.

(viii) Quenching and Tempering

After the tube end portions of a cut steel tube are subjected to reducing, in order to ensure that the tensile strength is at least 700 MPa in the portion of the steel tube which is not reduced in diameter, quenching is performed by heating and rapid cooling, and then tempering is carried out.

This quenching and tempering have conventionally been carried out on steel tubes for inflators, and basically it can be carried out in the same manner as in the conventional method. Preferred heat treatment conditions are as follows.

The heating temperature for quenching is at least the $Ac_1$ transformation point. If the heating temperature is lower than the $Ac_1$ transformation point, it is not possible to obtain the necessary high strength and toughness. This heating temperature is preferably at least the $Ac_3$ transformation point, which is a temperature in the austenite region.

Heating of a steel tube at a high temperature for a prolonged period of time may result in the formation of a large amount of scale on its surface, thereby worsening the surface condition and decreasing the burst resistance. Accordingly, heating for the purpose of quenching is preferably carried out by rapidly heating the steel tube to a predetermined heating temperature and then holding the temperature for a short period of time (such as at most 10 minutes). This rapid heating can be carried out with a rate of temperature increase of at least 10° C. per second. Such rapid heating can be achieved by high frequency induction heating or direct resistance heating, for example, and there are no particular restrictions on the heating means. A preferred heating means is high frequency induction heating.

In particular, in the case of such short-period heating (rapid heating and a short holding time), a preferred heating temperature is in the range of at least 900° C. to at most 1000° C., and most preferably it is in the range of at least 900° C. to at most 960° C. If the heating temperature is lower than 900° C., it is not possible to completely carry out austenitizing during a short heating period, and there are cases in which a desired normal structure is not obtained. If the heating temperature exceeds 1000° C., the austenite grains have coarsened diameters, which may result in a decreased toughness of steel. When the heating period is longer, the heating temperature may be lower.

The heating atmosphere when heating to a temperature of at least the $Ac_1$ transformation point is preferably an atmosphere with as low an oxygen potential as possible from the standpoint of suppressing the formation of surface scale, and a reducing atmosphere is still more preferred.

Cooling of the steel tube after heating to a temperature of at least the $Ac_1$ transformation point and preferably at least the $Ac_3$ transformation point is made rapid cooling (specifically, an average cooling rate of at least 5° C. per second in the temperature range from 850° C. to 500° C.) in order to obtain the desired the high strength stably and with certainty. The cooling rate is preferably at least 20° per second. This rapid cooling can be carried out by water quenching or the like.

In order to impart the desired high strength and good burst resistance to the steel tube which has been cooled to a vicinity of room temperature by rapid cooling, tempering is carried out thereon at a temperature of not higher than the $Ac_1$ transformation point. If the temperature for tempering is higher than the $Ac_1$ transformation point, it becomes difficult to obtain the above-described properties stably and with certainty. The tempering is preferably carried out by holding for at least 20 minutes in a temperature range of at least 450° C. and at most 650° C. The tempering temperature can be adjusted in accordance with the necessary final strength.

From an inflator bottle member having a reduced-diameter portion at both ends which has been manufactured in this manner, an airbag inflator was fabricated, as described above, by securing a lid plate on one end and mounting a member such as an initiator on the other end of the member by welding.

In an airbag inflator bottle member which is manufactured in accordance with the present invention, the reduced-diameter portions have essentially the same toughness as the portion which is not reduced in diameter due to quenching and tempering performed after end reducing. Accordingly, in an inflator which is manufactured from this bottle member, the low temperature toughness of the reduced-diameter portions is as good as that of the portion which is not reduced in diameter, and the burst resistance and reliability of the inflator are increased.

In the past, at the time of reducing of the tube end portions, the reduction ratio could not be made high for the reason that the toughness of the reduced-diameter portions is maintained. In the present invention, it is possible to carry out end reducing with a high reduction ratio, so it is easy for bottle members having different diameters in the portions which are not reduced in diameter to have the same dimensions of the reduced-diameter portions, thereby making it possible to use parts such as initiators and lid plates in common, and the cost of manufacturing an inflator can be reduced.

EXAMPLES

Using billets having the steel compositions shown in Table 1, seamless steel tubes having two different sizes, i.e., an outer diameter of 31.8 mm and a wall thickness of 2.7 mm, and an outer diameter of 60.3 mm and a wall thickness of 3.0 mm (referred to as Steel Tube A and Steel Tube B, respectively) were manufactured by piercing and rolling by usual Mannesmann mandrel mill processing, and these were used as blank steel tubes.

TABLE 1

| Steel No. | Steel composition [mass %, remainder = Fe and unavoidable impurities] | | | | | | | | | | | |
|---|---|---|---|---|---|---|---|---|---|---|---|---|
| | C | Si | Mn | Cr | sol. Al | Ca | Cu | Ni | Mo | V | Nb | Ti |
| 1 | 0.12 | 0.25 | 1.35 | 0.11 | 0.035 | 0.0020 | 0.19 | 0.28 | — | 0.01 | 0.015 | 0.020 |
| 2 | 0.16 | 0.23 | 0.51 | 0.73 | 0.040 | 0.0028 | 0.25 | 0.25 | 0.30 | — | 0.020 | 0.010 |
| 3 | 0.17 | 0.30 | 0.32 | 0.75 | 0.029 | 0.0025 | 0.35 | 0.35 | 0.40 | — | 0.025 | 0.007 |
| 4 | 0.11 | 0.35 | 1.28 | 0.13 | 0.025 | 0.0015 | 0.24 | 0.35 | — | — | 0.025 | 0.016 |
| 5 | 0.15 | 0.26 | 0.47 | 0.75 | 0.042 | 0.0028 | 0.30 | 0.30 | 0.30 | — | 0.020 | 0.007 |
| 6 | 0.16 | 0.31 | 0.31 | 0.74 | 0.030 | 0.0024 | 0.33 | 0.33 | 0.39 | — | 0.022 | 0.007 |

| Steel No. | Contents of impurities [mass %] | | |
|---|---|---|---|
| | P | S | O |
| 1 | 0.010 | 0.003 | 0.0024 |
| 2 | 0.015 | 0.002 | 0.0020 |
| 3 | 0.007 | 0.001 | 0.0018 |
| 4 | 0.008 | 0.002 | 0.0038 |
| 5 | 0.009 | 0.002 | 0.0040 |
| 6 | 0.011 | 0.001 | 0.0042 |

These blank Steel tubes A and B having different sizes were subjected, without performing prior heat treatment, to cold working by cold drawing under the conditions shown in Table 2, and then to stress relief low temperature annealing (abbreviated as SR) in order to remove strains which were induced by cold working followed by straightening (by a roller). The dimensions of Steel Tubes A and B (the variation in the outer diameter and the wall thickness) were measured after straightening. The measured results are shown in Table 2.

TABLE 2

|  |  | Steel tube A | Steel tube B |
|---|---|---|---|
| Process | Hot tube formation | outer diameter: 31.8 mm<br>wall thickness: 2.7 mm | outer diameter: 60.3 mm<br>wall thickness: 3.0 mm |
|  | Cold drawing | outer diameter: 25.0 mm<br>wall thickness: 2.0 mm<br>reduction in area: 41% | outer diameter: 50.0 mm<br>wall thickness: 2.4 mm<br>reduction in area: 34% |
|  | SR conditions | 650° C. × min. | 650° C. × min. |
| Result | Variation in outer diameter | at most 0.25 mm<br>(at most 1%) | at most 0.50 mm<br>(at most 1%) |
|  | Variation in wall thickness | at most 0.40 mm | at most 0.24 mm (at most 10%) |

These steel tubes A and B were cut to a predetermined length (200 mm) with a metal saw, and then both ends of the tubes were reduced by press working to achieve a reduction ratio in diameter of 3 levels, i.e., 15%, 30%, or 40%, so as to form the shape of inflator bottle members having reduced-diameter portions with a length of 20 mm. Then, quenching (Q) and tempering (T) were carried out under the conditions shown in Table 3 to manufacture inflator bottle members. The tensile strength of the portion which was not reduced in diameter (original tube portion) of each bottle member was measured, The measured results are compiled in Table 3.

The shape of a tensile test piece was as shown in FIG. 1. It was taken from a steel tube so that its lengthwise direction extended in the axial direction of the tube. The dimensions of each portion of the tensile test piece shown in FIG. 1 were as follows:

Steel Tube A: A=5 mm, B=30 mm, C=40 mm, D=80 mm, E=20 mm;

Steel Tube B: A=8 mm, B=30 mm, C=40 mm, D=110 mm, E=30 mm.

TABLE 3

| Steel No. | Q | T | Tensile strength of portions not reduced in diameter [MPa] | |
|---|---|---|---|---|
|  |  |  | Steel tube A | Steel tube B |
| 1 | 920° C. × 10 min. | 500° C. × 20 min. | 738 | 742 |
| 2 | 920° C. × 10 min. | 570° C. × 20 min. | 945 | 940 |
| 3 | 920° C. × 10 min. | 480° C. × 20 min. | 1045 | 1051 |
| 4 | 920° C. × 10 min. | 500° C. × 20 min. | 788 | 785 |
| 5 | 920° C. × 10 min. | 570° C. × 20 min. | 940 | 941 |
| 6 | 920° C. × 10 min. | 480° C. × 20 min. | 1039 | 1046 |

In order to investigate the low temperature toughness of the reduced-diameter portions of a bottle member in a simulated manner, using steel tubes which were reduced in diameter uniformly in the lengthwise direction with a reduction in diameter of 15%, 30%, or 40%, a static pressure burst test was carried out at −40° C. and the percent of the area of the resulting aperture which showed brittle fracture was measured. The results are shown in Table 4. The columns in Table 4 marked "With QT" indicate that quenching (Q) and tempering (T) were performed after diameter reducing, and those columns in Table 4 marked "No QT" are the results for the case in which diameter reducing was carried out without Q and T.

Separately, in order to simulate low temperature toughness of the portions not reduced in diameter (original tube portions), for steel tubes which underwent Q and T, using the original tube (which did not undergo diameter reducing), a static burst test was carried out at −40° C. and the percent of the area of the aperture which showed brittle fracture was measured. The test results are compiled in Table 5.

Figure 2:
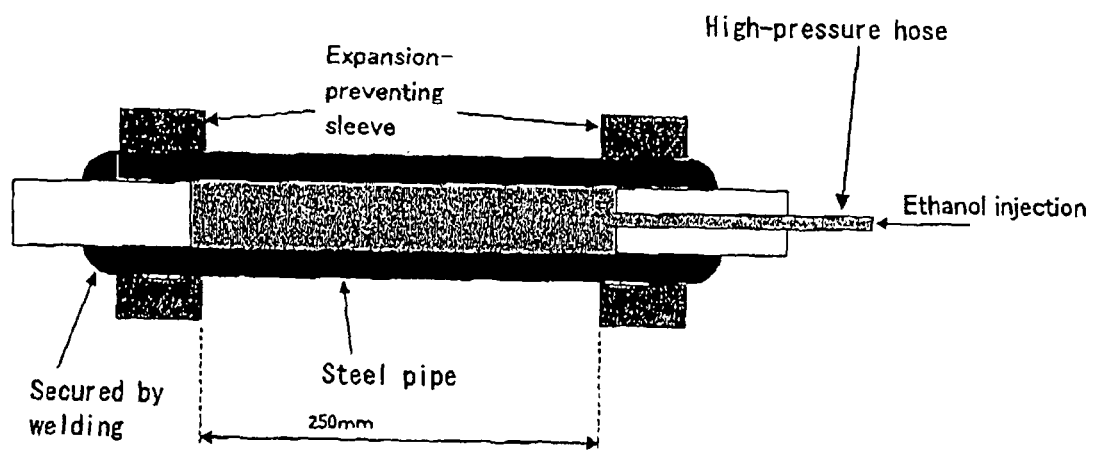
FIG. 2 is an explanatory view showing a burst test method.

As shown in FIG. 2, the burst test was carried out using a steel tube with a length of 350 mm taken from a steel tube which had undergone diameter reducing with a predetermined reduction ratio (Table 4) or from an original tube (Table 5). A test piece was prepared by covering both ends of the steel tube with an expansion-preventing sleeve for a width of 50 mm so that the effective length of the test piece (the length of the portion of the steel tube not constrained by sleeves) was adjusted to 250 mm, welding a solid sealing member to one end of the steel tube, and welding a sealing member through which a high-pressure hose passed to the other end. This test piece was immersed in ethanol in a chamber which was cooled to −40° C., ethanol was injected into the tube through the high-pressure hose to increase the internal pressure until the tube burst, and the fracture surface of the resulting aperture was observed.

In Tables 4 and 5, cases for which the percent of the area of the aperture which showed brittle fracture was less than 5% are indicated with a circle, and those for which it was at least 5% are indicated with an X. In order to investigate variation in toughness, for each test member, a static pressure burst test was performed three times. The three test results are shown in Tables 4 and 5.

TABLE 4

| | | | | (N = 3) |
|---|---|---|---|---|
| | Reduction | Steel tube A | | Steel tube B | |
| Steel No. | in diameter | With QT | No QT | With QT | No QT |
| 1 | 15% | ○○○ | XXX | ○○○ | XXX |
|  | 30% | ○○○ | XXX | ○○○ | XXX |
|  | 40% | ○○○ | XXX | ○○○ | XXX |
| 2 | 15% | ○○○ | XXX | ○○○ | XXX |
|  | 30% | ○○○ | XXX | ○○○ | XXX |
|  | 40% | ○○○ | XXX | ○○○ | XXX |

TABLE 4-continued

|  |  | Steel tube A | | Steel tube B | | (N = 3) |
| --- | --- | --- | --- | --- | --- | --- |
| Steel No. | Reduction in diameter | With QT | No QT | With QT | No QT | |
| 3 | 15% | OOO | XXX | OOO | XXX | |
|  | 30% | OOO | XXX | OOO | XXX | |
|  | 40% | OOO | XXX | OOO | XXX | |
| 4 | 15% | OOO | XXX | OOO | XXX | |
|  | 30% | OOO | XXX | OOO | XXX | |
|  | 40% | OOO | XXX | OOO | XXX | |
| 5 | 15% | OOO | XXX | OOO | XXX | |
|  | 30% | OOO | XXX | OOO | XXX | |
|  | 40% | OOO | XXX | OOO | XXX | |
| 6 | 15% | OOO | XXX | OOO | XXX | |
|  | 30% | OOO | XXX | OOO | XXX | |
|  | 40% | OOO | XXX | OOO | XXX | |

TABLE 5

| Steel No. | Steel tube A | Steel tube B (N = 3) |
| --- | --- | --- |
| 1 | OOO | OOO |
| 2 | OOO | OOO |
| 3 | OOO | OOO |
| 4 | OOO | OOO |
| 5 | OOO | OOO |
| 6 | OOO | OOO |

Separately, as comparative examples, an inflator bottle member was manufactured by a conventional method in which quenching (Q) and tempering (T) were previously performed on Steel Tubes A and B having the steel compositions shown in Table 1, then cold drawing was carried out under the conditions shown in Table 2, and low temperature annealing for stress relief (SR) were performed, and cutting and diameter reducing were carried out in the same manner as described above. The results of measurement of the tensile strength of the portion which was not reduced in diameter (original tube portion) of the resulting bottle members and the heat treatment conditions are together shown in Table 6.

TABLE 6

| Steel No. | Q | T | SR | Tensile strength of portions not reduced in diameter [MPa] | |
| --- | --- | --- | --- | --- | --- |
|  |  |  |  | Steel tube A | Steel tube B |
| 1 | 920° C. × 10 min. | 500° C. × 20 min. | 580° C. × 20 min. | 743 | 739 |
| 2 | 920° C. × 10 min. | 600° C. × 20 min. | 590° C. × 20 min. | 946 | 952 |
| 3 | 920° C. × 10 min. | 600° C. × 20 min. | 450° C. × 20 min. | 1052 | 1046 |
| 4 | 920° C. × 10 min. | 500° C. × 20 min. | 580° C. × 20 min. | 795 | 790 |
| 5 | 920° C. × 10 min. | 600° C. × 20 min. | 590° C. × 20 min. | 940 | 938 |
| 6 | 920° C. × 10 min. | 600° C. × 20 min. | 450° C. × 20 min. | 1044 | 1045 |

For the comparative examples shown in Table 6, using a steel tube which was uniformly reduced in diameter to simulate a reduced-diameter portion of a bottle member and an original tube simulating a portion which is not reduced in diameter (an original tube portion), a static pressure burst test was carried out at −40° C. in the same manner as described above, and the results observed for the percent of the area of the aperture which showed brittle fracture are shown in Table 7 (reduced-diameter tube) and Table 8 (original tube).

TABLE 7

| Steel No. | Reduction in diameter | Steel tube A | Steel tube B (N = 3) |
| --- | --- | --- | --- |
| 1 | 15% | XXX | XXX |
|  | 30% | XXX | XXX |
|  | 40% | XXX | XXX |
| 2 | 15% | XXX | XXX |
|  | 30% | XXX | XXX |
|  | 40% | XXX | XXX |
| 3 | 15% | XXX | XXX |
|  | 30% | XXX | XXX |
|  | 40% | XXX | XXX |
| 4 | 15% | XXX | XXX |
|  | 30% | XXX | XXX |
|  | 40% | XXX | XXX |
| 5 | 15% | XXX | XXX |
|  | 30% | XXX | XXX |
|  | 40% | XXX | XXX |
| 6 | 15% | XXX | XXX |
|  | 30% | XXX | XXX |
|  | 40% | XXX | XXX |

TABLE 8

| Steel No. | Steel tube A | Steel tube B (N = 3) |
| --- | --- | --- |
| 1 | OOO | OOO |
| 2 | OOO | OOO |
| 3 | OOO | OOO |
| 4 | OOO | OOO |
| 5 | OOO | OOO |
| 6 | OOO | OOO |

From the results shown in Tables 4 and 5 and Tables 7 and 8, it can be seen that by varying the order of steps so as to carry out quenching and tempering after reducing the diameter of the tube ends according to the present invention, it is possible to manufacture an inflator bottle member which stably has excellent low temperature toughness suitable for an inflator not only in the portion which is not reduced in diameter but also in the reduced-diameter portions as evidenced by no appearance of brittle fracture in a burst test of the reduced-diameter portions. From comparing Table 3 and Table 6, even if the order of steps is varied, the tensile strength is at the same level, and a high strength of at least 700 MPa is achieved by quench hardening.

As can be seen from the results in Tables 1-8, according to the present invention, even with a high reduction ratio such as 40% which produced a decrease in the low temperature toughness of reduced-diameter portions in the case of the conventional method in which reducing was performed after quenching and tempering, reducing can be carried out without any worry of a decrease in low temperature toughness, and the reduced-diameter portions have a low temperature toughness which is comparable to that of the portion which is not reduced in diameter.

As a result, when performing mass production of bottle members for airbag inflators, it is possible to employ a process in which multiple types of steel tubes having different outer diameters are subjected to reducing the end portions thereof at different reduction ratios so that the reduced-diameter portions have the same predetermined outer diameter before they are subjected to quenching and tempering.

Namely, according to the present invention, it is possible to carry out mass production of airbag inflator bottle members in which (i) reduced-diameter portions have the same good low temperature toughness as the portion which is not reduced in diameter, (ii) even if the outer diameters of portions which are not reduced in diameter (namely, the outer diameter of the steel tubes) are different, the outer diameter of the reduced-diameter portions can all be made a fixed dimension, and (iii) the tensile strength of the portion which is not reduced in diameter is at least 700 MPa. Thus, a large number of bottle members for airbag inflators which are mass produced in this manner have a constant diameter of the reduced-diameter portion of the tube ends regardless of the outer diameter of the portion which is not reduced in diameter, so parts such as initiators and lid plates which are fitted to the tube ends can be used in common and the number of types thereof can be reduced, whereby the manufacturing costs of airbags can be reduced.

The invention claimed is:

1. A process for manufacturing an airbag inflator bottle member comprising a tubular body including opposing end portions of the tubular body, one or both of the end portions having a reduced-diameter, comprising performing cold working on a steel tube having a steel composition which consists essentially of, in mass percent, C: 0.05-0.20%, Si: 0.1-1.0%, Mn: 0.10-2.0%, Cr: 0.05-2.0%, sol. Al: at most 0.10%, Ca: at most 0.01%, Cu: 0-1.0%, Ni: 0-1.5%, Mo: 0-1.0%, V: 0-0.2%, Nb: 0-0.1%, Ti: 0-0.1%, and remainder of Fe and unavoidable impurities, with the contents of impurities being at most 0.025% for P and at most 0.010% for S, cutting the cold worked steel tube to a length of the airbag inflator bottle member, reducing the diameter at one or both end portions of the cut steel tube such that a non-reduced portion of the steel tube remains, and subjecting the steel tube to quenching and tempering such that the tensile strength of the non-reduced portion is at least 700 MPa.

2. A process for manufacturing an airbag inflator bottle member as set forth in claim 1 wherein the steel composition contains one or more elements selected from Cu: 0.05-1.0%, Ni: 0.05-1.5%, Mo: 0.05-1.0%, V: 0.01-=0.2%, Nb: 0.003-0.1%, and Ti: 0.002-0.1%.

3. An airbag inflator bottle member comprising a tubular body including opposing end portions, one or both of the opposing end portions having a reduced-diameter portion, and a portion not reduced in diameter, characterized in that the reduced diameter portion and the portion not reduced in diameter have an as quenched and tempered structure and the tubular body is made of a steel consisting essentially of, in mass percent, C: 0.05-0.20%, Si: 0.1-1.0%, Mn: 0.10-2.0%, Cr: 0.05-2.0%, sol. Al: at most 0.10%, Ca: at most 0.01%, Cu: 0-1.0%, Ni: 0-1.5%, Mo: 0-0-1.0%, V: 0-0.2%, Nb: 0-0.1%, Ti: 0-0.1%, and a remainder of Fe and unavoidable impurities, with the contents of the impurities being at most 0.025% for P and at most 0.010% for S, the portion not reduced in diameter having a tensile strength of at least 700 MPa.

4. An airbag inflator bottle member as set forth in claim 3 wherein the steel composition contains one or more elements selected from Cu: 0.05-1.0%, Ni: 0.05-1.5%, Mo: 0.05-1.0%, V: 0.01-0.2%, Nb: 0.003-0.1%, and Ti: 0.002-0.1%.

* * * * *